United States Patent
Yi (10) Patent No.: US 11,239,527 B2
(45) Date of Patent: Feb. 1, 2022

(54) TRAY FOR SECONDARY BATTERIES AND JIG FOR FORMING THE SAME

(71) Applicant: Samsung SDI Co., Ltd., Yongin-si (KR)

(72) Inventor: Jaeok Yi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 16/250,619

(22) Filed: Jan. 17, 2019

(65) Prior Publication Data
US 2019/0259983 A1 Aug. 22, 2019

(30) Foreign Application Priority Data
Feb. 22, 2018 (KR) .................. 10-2018-0021175

(51) Int. Cl.
| | |
|---|---|
| *H01M 50/20* | (2021.01) |
| *H01M 50/107* | (2021.01) |
| *H01M 50/213* | (2021.01) |
| *H01M 50/256* | (2021.01) |

(52) U.S. Cl.
CPC ....... *H01M 50/256* (2021.01); *H01M 50/213* (2021.01); *H01M 2220/30* (2013.01)

(58) Field of Classification Search
None
See application file for complete search history.

(56) References Cited

U.S. PATENT DOCUMENTS

| | | | |
|---|---|---|---|
| 8,945,746 B2 | 2/2015 | Kwag et al. | |
| 9,703,002 B1 | 7/2017 | Olsson et al. | |
| 9,853,257 B2 | 12/2017 | Ok et al. | |
| 10,727,459 B2 | 7/2020 | Yi | |
| 11,050,115 B2 | 6/2021 | Guen et al. | |
| 2010/0330404 A1 | 12/2010 | Nishino et al. | |

(Continued)

FOREIGN PATENT DOCUMENTS

| | | |
|---|---|---|
| CN | 101346832 A | 1/2009 |
| CN | 101997099 A | 3/2011 |

(Continued)

OTHER PUBLICATIONS

Chinese Office action for Application No. 201910124132.8, dated Jul. 5, 2021, 8 pages.

*Primary Examiner* — Yoshitoshi Takeuchi
(74) *Attorney, Agent, or Firm* — Lewis Roca Rothgerber Christie LLP (57) ABSTRACT

Provided are a tray for a secondary battery, which is environmentally friendly and can reduce the manufacturing cost while improving formability of the tray, and a jig for forming the tray. The tray includes a series of receiving spaces for receiving a series of cylindrical secondary batteries, and a flange portion at an outer part of the receiving space. Each receiving space includes a bottom surface configured to support one cylindrical secondary battery, a series of fixing ribs protruding upwardly from the bottom surface, and a series of bridges protruding upwardly from the bottom surface. The fixing ribs are spaced apart from each other and spaced around an outer portion of the bottom surface. Each bridge of the series of bridges connects adjacent fixing ribs.

6 Claims, 6 Drawing Sheets

(56) References Cited

U.S. PATENT DOCUMENTS

| | | | | |
|---|---|---|---|---|
| 2011/0039142 A1* | 2/2011 | Kwag | ................ | G01V 3/10 |
| | | | | 429/99 |
| 2016/0319125 A1* | 11/2016 | Hyun | ................ | C08L 67/02 |
| 2016/0336555 A1 | 11/2016 | Guen et al. | | |
| 2017/0162839 A1 | 6/2017 | Botadra et al. | | |
| 2017/0200928 A1 | 7/2017 | Yi | | |

FOREIGN PATENT DOCUMENTS

| | | |
|---|---|---|
| CN | 205335320 U | 6/2016 |
| CN | 106144135 A | 11/2016 |
| CN | 106415879 A | 2/2017 |
| KR | 10-2010-0123828 A | 11/2010 |
| KR | 10-2015-0113656 A | 10/2015 |
| KR | 10-2016-0013344 A | 2/2016 |
| KR | 10-2016-0133975 A | 11/2016 |

* cited by examiner

TRAY FOR SECONDARY BATTERIES AND JIG FOR FORMING THE SAME

CROSS-REFERENCE TO RELATED APPLICATION

This application claims priority to and the benefit of Korean Patent Application No. 10-2018-0021175 filed on Feb. 22, 2018 in the Korean Intellectual Property Office, and all the benefits accruing therefrom under 35 U.S.C. 119, the contents of which in its entirety are herein incorporated by reference.

BACKGROUND

1. Field

The present disclosure relates to a tray for a secondary battery and a jig for forming the same.

2. Description of the Related Art

Unlike a primary battery that cannot be charged, a secondary battery may be recharged. A low-capacity secondary battery comprised of one single battery cell is used as the power source for various portable small-sized electronic devices, such as cellular phones, and camcorders. A high-capacity secondary battery in which several tens of battery cells are connected in a battery pack is widely used as the power source for motor drives, such as those in hybrid vehicles.

In mass transportation of the secondary battery, a tray having a space for receiving a plurality of secondary batteries may be used. Since the tray is generally formed using a plastic material, wrinkles in forming the tray or warpage due to non-formed portions may be generated. In addition, greenhouse gas emissions, which are associated with the occurrence of global warming, may occur due to waste incineration.

SUMMARY

Embodiments of the present disclosure provide a tray for a series of secondary batteries, which is environmentally friendly and can reduce the manufacturing cost while improving formability of the tray, and a jig for forming the tray.

According to an aspect of the present disclosure, there is provided a tray for a series of cylindrical secondary batteries, the tray including a series of receiving spaces for receiving the series of cylindrical secondary batteries, and a flange portion at an outer part of the series of receiving spaces. Each receiving space includes a bottom surface configured to support one of the secondary batteries, a series of fixing ribs protruding upwardly from the bottom surface, and a series of bridges protruding upwardly protruding from the bottom surface. The fixing ribs are spaced apart from each other and spaced around the bottom surface. Each bridge connects adjacent fixing ribs.

When a first cylindrical secondary battery is received in an inner part of the tray, the first cylindrical secondary battery may be supported by four fixing ribs. When a second cylindrical secondary battery is received in an outermost part of the tray, the second cylindrical secondary battery may be supported by three fixing ribs.

The fixing ribs may include first fixing ribs in an interior of the flange portion, and second fixing ribs on inner wall surfaces of the flange portion The first fixing ribs may be spaced apart from each other at 90 degree intervals relative to a center point of the bottom surface.

Each bridge may have a smaller area than each fixing rib Each bridge may have a lower height than each fixing rib.

The flange portion may include a pair of first flange parts extending in a first direction of the tray and parallel with each other, and a pair of second flange parts extending in a second direction perpendicular to the first direction and connecting the pair of first flange parts together. At least one first flange of the pair of first flanges may include an impact absorbing unit extending downwardly and convexly from the at least one first flange part.

The tray may include a plastic, an inorganic material, a decomposition agent, a dispersant, and a lubricant.

The plastic may be contained in an amount of 66% to 70%, the inorganic material may be contained in an amount of 30% to 33%, the decomposition agent may be contained in an amount of 1% to 3%, and the dispersant agent and lubricant are contained in an amount of 1% to 3%.

According to another aspect of the present disclosure, there is provided a jig for forming a tray for a series of secondary batteries. In one embodiment, the jig includes a lower mold made of a metal, and an upper plug made of wood configured to mate with the lower mold. The lower mold is a relief structure.

The jig may include an upwardly extending protrusion in the lower mold configured to form a receiving space of the tray, and a coupling groove in the upper plug corresponding to the upwardly extending protrusion of the lower mold.

The jig may include a discharge hole extending through the upper plug at a center of the coupling groove.

As described above, in the tray for a series of secondary batteries according to one or more embodiments of the present disclosure, the number of fixing ribs for fixing the series of cylindrical secondary batteries received at the outermost part of the tray is smaller than the number of fixing ribs for fixing the cylindrical secondary batteries received in an inner part of the tray, and the height of each of the bridges is lower than that of the fixing ribs, thereby improving the formability of the tray.

In addition, the tray for a series of cylindrical secondary batteries according to one or more embodiments of the present disclosure includes about 30% of an inorganic material and about 66% of a plastic, which is reduced as compared with a related art tray, thereby exhibiting environmentally friendly features, including oxo-biodegradability and photo-degradability, and reducing the manufacturing cost and improving the production quality.

BRIEF DESCRIPTION OF THE DRAWINGS

The above and other features and advantages of the present invention will become more apparent by describing in detail preferred embodiments thereof with reference to the attached drawings. Additionally, the patent or application file contains at least one drawing executed in color. Copies of this patent or patent application publication with color drawing(s) will be provided by the Office upon request and payment of the necessary fee.

DETAILED DESCRIPTION

Hereinafter, aspects of embodiments of the present disclosure will be described in detail.

Various embodiments of the present disclosure may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

Figure 1:
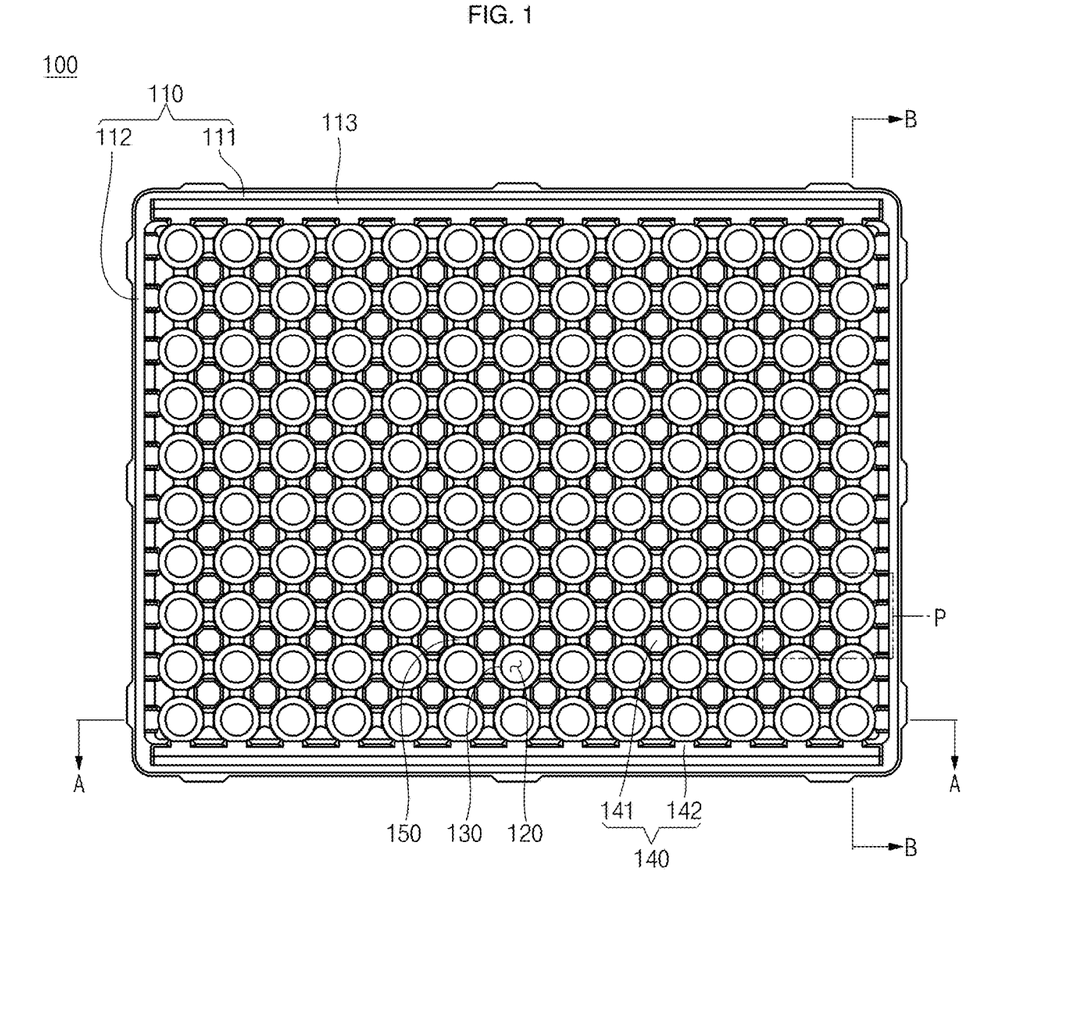
FIG. 1 is a plan view illustrating a tray fora secondary battery according to an embodiment of the present disclosure.
Figure 2:
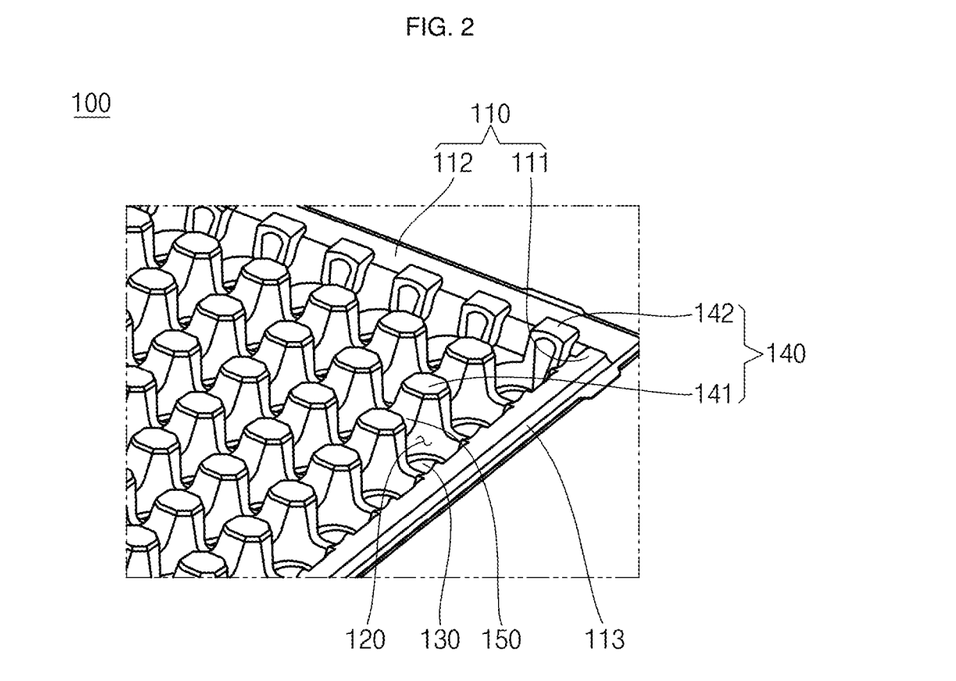
FIGS. 2 and 3 are perspective views illustrating the tray for a secondary battery according to an embodiment of the present disclosure.
Figure 3:
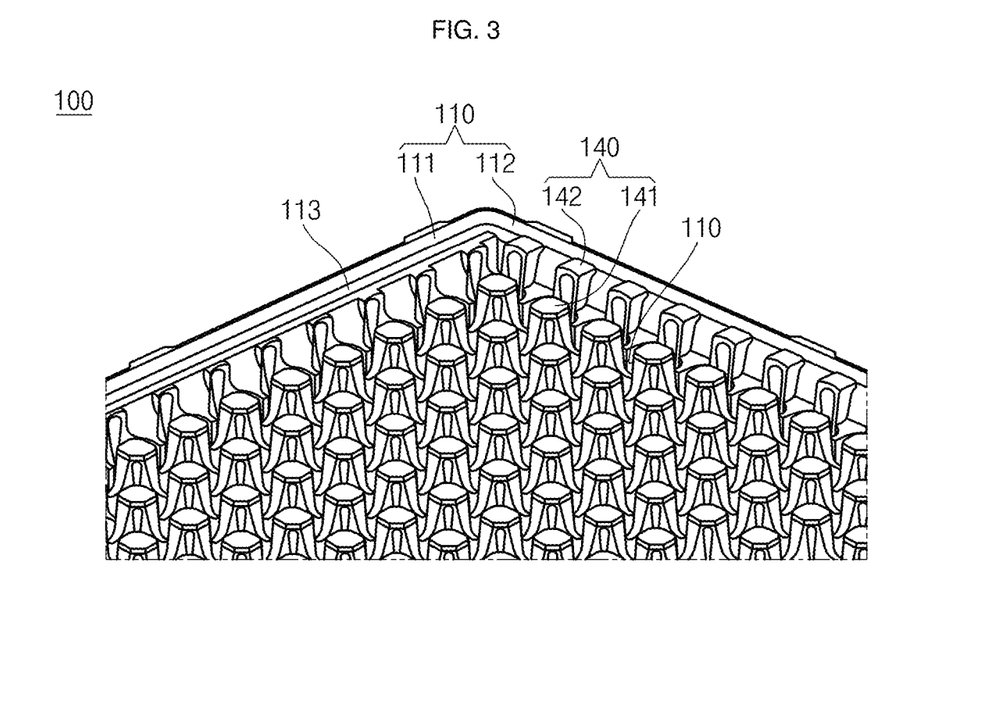
Figure 4:
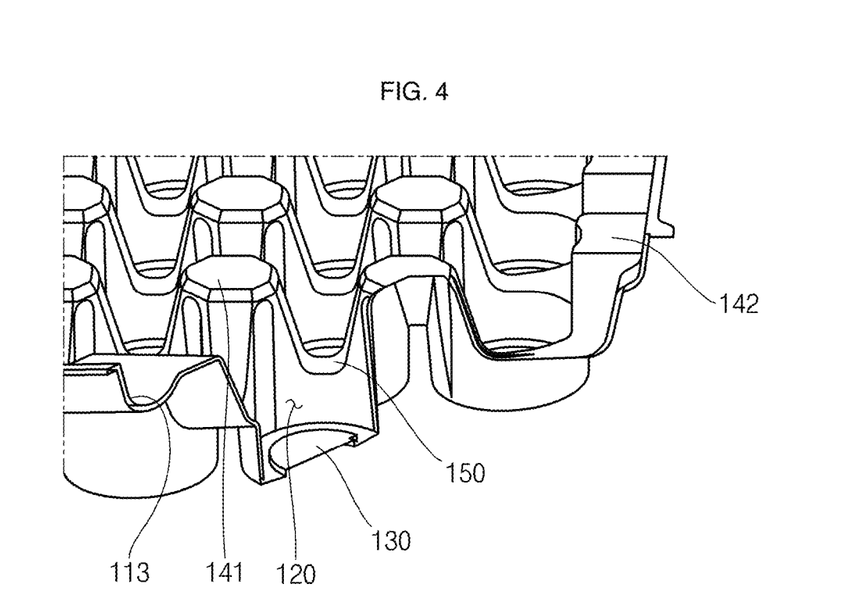
FIG. 4 is an enlarged perspective view illustrating a portion of FIG. 2.
Figure 5:
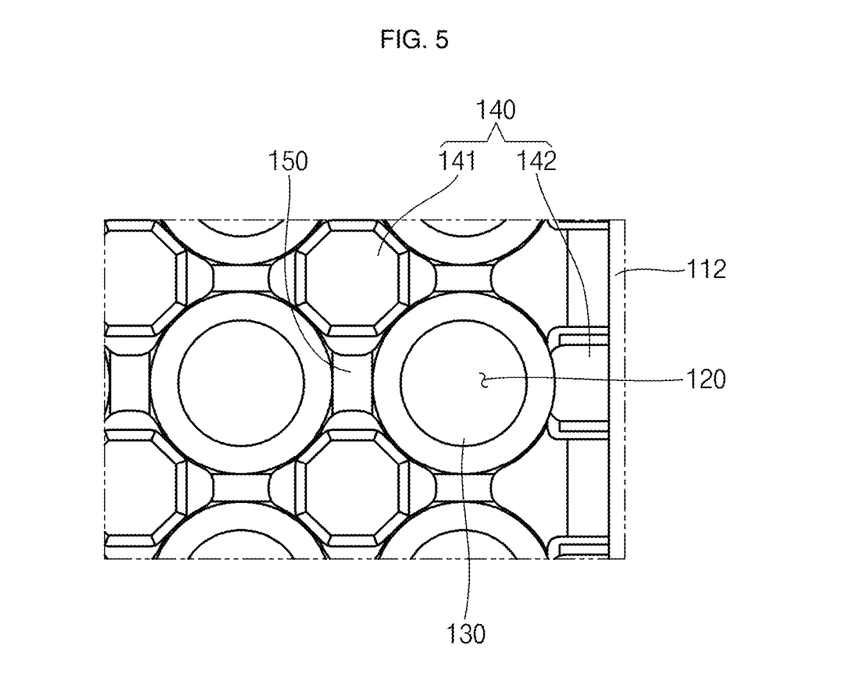
FIG. 5 is an enlarged plan view illustrating a portion P of FIG. 1.
Figure 6:
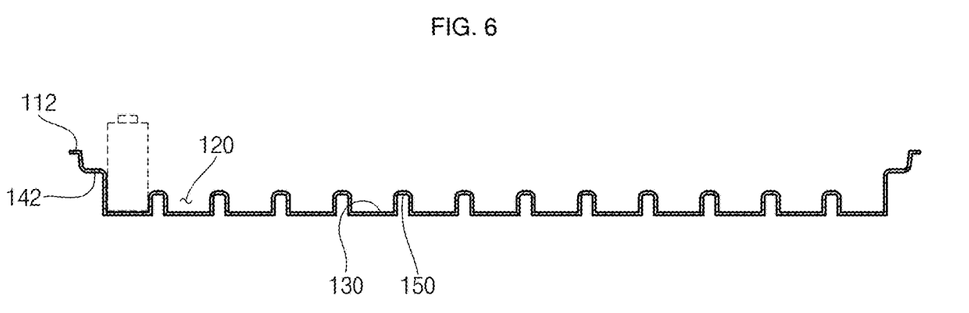
FIG. 6 is a cross-sectional view taken along the line A-A of FIG. 1.
Figure 7:
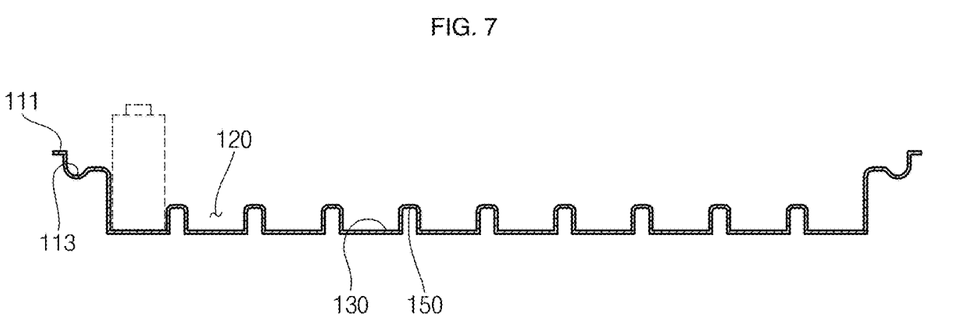
FIG. 7 is a cross-sectional view taken along the line B-B of FIG. 1.
Figure 8:
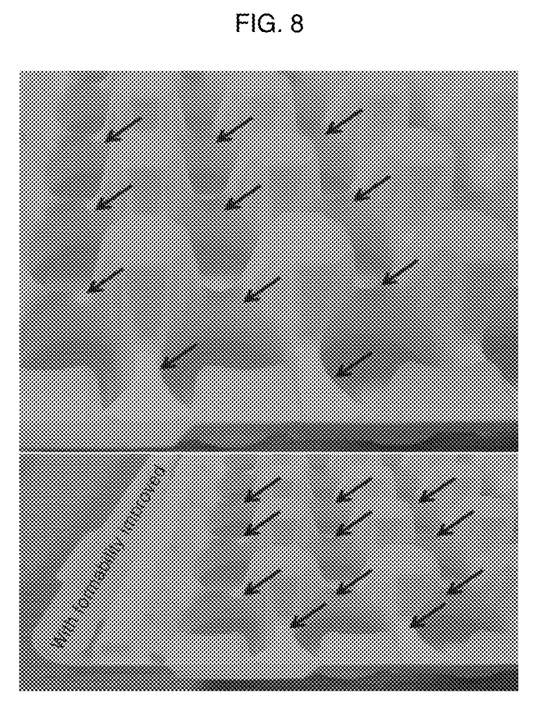
FIGS. 8 to 10 are photographs of the tray for a secondary battery according to an embodiment of the present disclosure.
Figure 9:
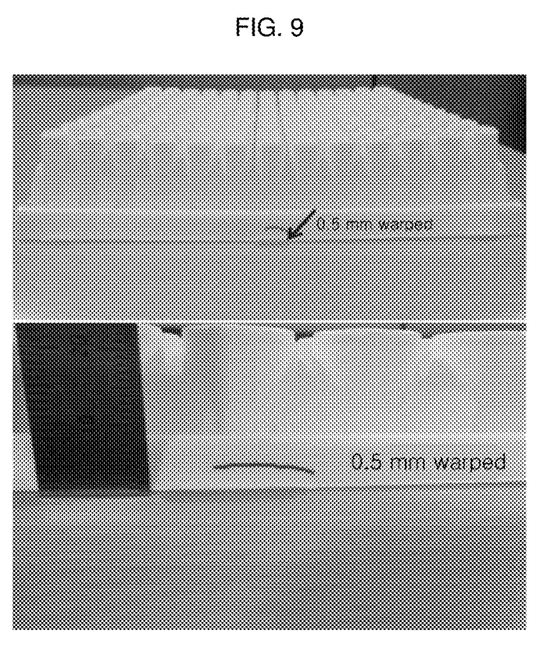
Figure 10:
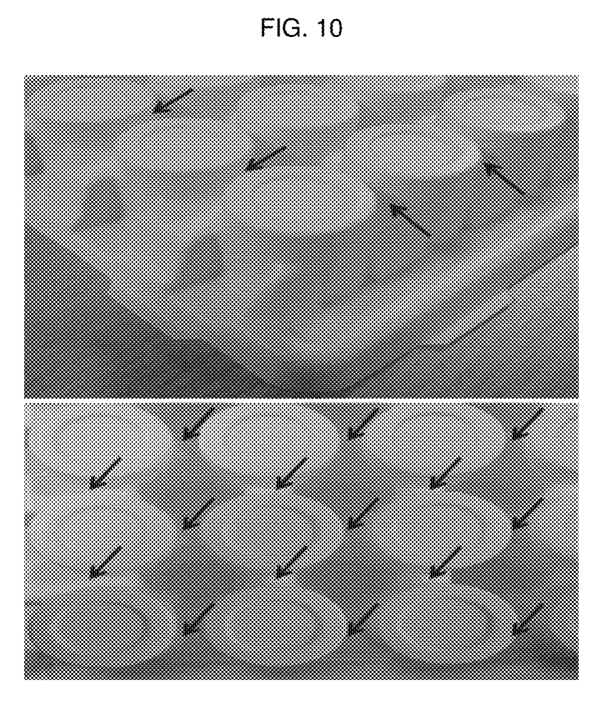

FIG. 1 is a plan view illustrating a tray fora secondary battery according to an embodiment of the present disclosure. FIGS. 2 and 3 are perspective views illustrating the tray for a secondary battery according to an embodiment of the present disclosure. FIG. 4 is an enlarged perspective view illustrating a portion of FIG. 2. FIG. 5 is an enlarged plan view illustrating a portion P of FIG. 1. FIG. 6 is a cross-sectional view taken along the line A-A of FIG. 1. FIG. 7 is a cross-sectional view taken along the line B-B of FIG. 1. FIGS. 8 to 10 are photographs of the tray for a secondary battery according to an embodiment of the present invention.

Referring to FIGS. 1 to 7, the tray 100 for a secondary battery according to an embodiment of the present disclosure includes a flange portion 110 and a plurality of receiving spaces 120 formed in an inner portion of the flange portion 110 to receive cylindrical secondary batteries.

The flange portion 110 corresponds to the outermost part of the tray 100 and, in the illustrated embodiment, is a substantially rectangular band. The flange portion 110 includes a pair of first flange parts 111 extending in a first direction of the tray 100 and parallel with each other, and a pair of second flange parts 112 extending in a second direction perpendicular to the first direction and connecting the pair of first flange parts 111 (e.g., opposite ends of the first flange parts 111 are connected to the second flange parts 112, and opposite ends of the second flange parts 112 are connected to the first flange parts 111, such that the first and second flange parts 111, 112 are arranged in a rectangular configuration). An impact absorbing unit 113 is formed on the first flange part 111. The impact absorbing unit 113 extends in a lengthwise direction of the first flange part 110 and is shaped of a channel that protrudes downwardly and convexly. The impact absorbing unit 113 may absorb impacts or vibrations applied from lateral surfaces of the tray 100, thereby protecting the secondary batteries received in the tray 100. In addition, fixing ribs 140 to be described later are formed on inner wall surfaces of the flange portion 110, thereby securely fixing the secondary batteries.

The receiving space 120 includes a bottom surface 130, fixing ribs 140 and bridges 150. In one or more embodiments, each receiving space 120 is defined by the bottom surface 130, and the fixing ribs 140 and the bridges 150 surrounding the bottom surface 130, which forms a space on or in which the secondary battery is mounted. In the illustrated embodiment, the tray 100 includes a plurality of receiving spaces 120 for receiving a plurality of secondary batteries. In one or more embodiments, the receiving spaces 120 may be formed in the inner portion of the flange portion 110 and are spaced a predetermined distance apart from each other in the first and second directions of the tray 100. In addition, the cylindrical secondary batteries may be received in the receiving spaces 120 such that electrode terminals are exposed to an upper portion of the tray 100.

The bottom surface 130 is a surface on which the cylindrical secondary battery is mounted. In addition, the bottom surface 130 is formed to have a circular shape corresponding to a vertical section of the cylindrical secondary battery so as to receive the cylindrical secondary battery. In addition, the bottom surface 130 is formed to be lower than the top end of the flange portion 110, thereby stably receiving the secondary battery.

The fixing ribs 140 protrude upwardly from the bottom surface 130. The fixing ribs 140 include first fixing ribs 141 formed in the inner part of the flange portion 110 and second fixing ribs 142 formed on inner wall surfaces of the flange portion 110.

The first fixing ribs 141 are formed at outer portions of the bottom surface 130 in pillar shapes and, in the illustrated embodiment, four first fixing ribs 141 are spaced around (e.g., surround) one single bottom surface 130. In the illustrated embodiment, the first fixing ribs 141 are spaced at 90 degree or approximately 90 degree intervals apart from each other relative to a center point of the bottom surface 130. In addition, in the illustrated embodiment, the secondary battery supported on one of the bottom surfaces 130 is supported by one surface of each of the four first fixing ribs 141 around the bottom surface 130. Additionally, one of the first fixing ribs 141 may support some of the neighboring four secondary batteries. The first fixing ribs 141 may be polygonal pillars, cylindrical pillars, or any other suitable shaped pillar.

The second fixing ribs 142 are formed to protrude from inner wall surfaces of the flange portions 110 toward an interior of the tray 100. In the illustrated embodiment, the number of the second fixing ribs 142 is equal to the number of bottom surfaces 130 formed on the outermost part (e.g., the outer periphery) of the tray 100. Therefore, the second fixing ribs 142 may support the outermost ones of the secondary batteries (e.g., the secondary batteries at the outer periphery of the tray 100). In a case where n bottom surfaces 130 are formed at a portion adjacent to the flange portion 110, for example, n second fixing ribs 142 are formed on the inner wall surfaces of the flange part 110 as well.

Referring to FIG. 5, a secondary battery received in one of the receiving spaces 120 positioned in the inner part of the tray 100 is supported by four fixing ribs 140, that is, four first fixing ribs 141. In addition, in the illustrated embodiment, a secondary battery received in one of the outermost receiving spaces 120 of the tray 100 is supported by three fixing ribs 140, that is, two first fixing ribs 141 and one second fixing rib 142. In the illustrated embodiment, a secondary battery received in one of the receiving spaces 120 positioned at a corner of the tray 100 is supported by one first fixing rib 141 and two second fixing ribs 142. As described above, according to the present disclosure, the formability (e.g., manufacturability) of the tray 100 can be improved by forming the fixing ribs 140 such that the number of the fixing ribs 140 for fixing the secondary battery received in the outermost part of the tray 100 (e.g., the outer periphery of the tray 100) is smaller than the number of the secondary batteries received in the inner part of the tray 100.

In the illustrated embodiment, each of the bridges 150 is formed to protrude upwardly from the outer part of a respective one of the bottom surfaces 130. The brides 150 connect adjacent fixing ribs 140 to each other. In addition, the heights of the bridges 150 are lower than (less than) the heights of the fixing ribs 140, thereby improving the formability of the tray 100. Otherwise, in a case where the bridges 150 and the fixing ribs 140 are formed to have the same height, wrinkles or non-formed portions may be created at the bridge portions, resulting in warpage of the tray 100 as a whole. Therefore, according to various embodiments of the present disclosure, the bridges 150 are formed to have smaller areas and smaller heights than the fixing ribs 140, thereby improving the formability of the tray 100.

As illustrated in FIG. 8, which is a photograph depicting a tray manufactured according to one embodiment of the present disclosure, there are no non-formed portions present at bridge portions, as indicated by the arrows. In addition, as illustrated in FIG. 9, the overall tray warpage was improved compared to a related art tray for secondary batteries. Whereas the extent of warpage of a related tray is in the range from 4 mm to 6 mm, the extent of warpage of the tray according to one or more embodiments of the present disclosure was about 0.5 mm, which indicates that the occurrence of the warpage was significantly suppressed in trays according to various embodiments of the present disclosure. In addition, as illustrated in FIG. 10, it is confirmed that wrinkles are not created at the bridge portions (portions indicated by the arrows).

In one or more embodiments, the tray 100 for secondary batteries according to the present disclosure may include an environmentally friendly bioplastic material. In one or more embodiments, a composition of the tray 100 may include a plastic, an inorganic material, a decomposition agent, a dispersant agent and a lubricant. The plastic may include one selected from the group consisting of polyethylene (PE), polypropylene (PP), polystyrene (PS), polyvinylchloride (PVC), ABS, linear low density polyethylene (LLDPE), low density polyethylene (LDPE), and high density polyethylene (HDPE). The plastic may include polypropylene (PP) and high density polyethylene (HDPE). The plastic may be contained in an amount of about 66% to about 70%.

The inorganic material may include one among silicon dioxide ($SiO_2$), talc and calcium carbonate ($CaCO_3$). The inorganic material may include silicon dioxide ($SiO_2$). The inorganic material serves to reduce a proportion of the plastic contained in the composition of the tray 100. Accordingly, a density and a heat decomposition temperature of the tray 100 may increase and an elongation ratio thereof may decrease, thereby improving the shrinkage property of the tray 100. That is, since the tray 100 contains an inorganic material, a prolonged cooling time, which is one of shortcomings of the plastic, can be reduced, and molding defects can be reduced by lowering the shrinkage. The inorganic material may be contained in an amount of about 30% to about 33%. If the amount of the inorganic material is less than 30%, the elongation may increase and the cooling time may be extended, resulting in poor formability due to occurrence of non-formable portions or warpage. In addition, if the amount of the inorganic material is greater than 33%, the mechanical strength of the tray 100 may be lowered. Since the composition of the tray 100 according to the present invention includes greater than 30% of the inorganic material, the tray 100 can be certified as an environmentally friendly product. As described above, if the proportion of the plastic is lowered, greenhouse gas emission can be reduced, thereby considerably contributing to global warming prevention.

The decomposition agent may serve to make the tray 100 slowly undergo oxo-biodegradation and photo-degradation about 3 years after the tray 100 is formed. The decomposition agent may include 80% polyethylene, 10% aliphatic carboxylic acid, 7% iron oxide, and 3% ketone. In addition, the decomposition agent may be contained in an amount of about 1% to about 3%, such as 2% or about 2%. If the amount of the decomposition agent is less than 1%, the oxo-biodegradation and photo-degradation of the tray 100 are difficult to achieve. In addition, if the amount of the decomposition agent is greater than 3%, the oxo-biodegradation and photo-degradation of the tray 100 may occur in less than 3 years after the tray 100 is formed, resulting in a shortened life of the tray 100.

The dispersant agent and the lubricant may serve to allow the inorganic material to be dispersed well. The dispersant agent may include ethylenediamine. The dispersant agent and the lubricant may be contained in an amount of about 1% to about 3%, such as 2% or about 2%. If the amount of the dispersant agent and the lubricant is less than 1% or greater than 3%, the inorganic material may not be evenly distributed throughout the composition in a sheet form but may be unevenly lumped during mixing compositional materials of the tray 100. Accordingly, during the manufacture of the tray 100, shrinkage depending on heat or cooling may be differently applied throughout the sheet-form composition, resulting in molding defects, such as warpage or non-formed portions.

As described above, since the tray 100 for secondary batteries according to the present invention includes about 30% of an inorganic material and about 66% of a plastic, which is a reduced amount as compared with a related art tray, environmentally friendly features are demonstrated owing to excellent oxo-biodegradability and photo-degradability, the manufacturing cost can be reduced and the product quality can be improved.

Figure 11:
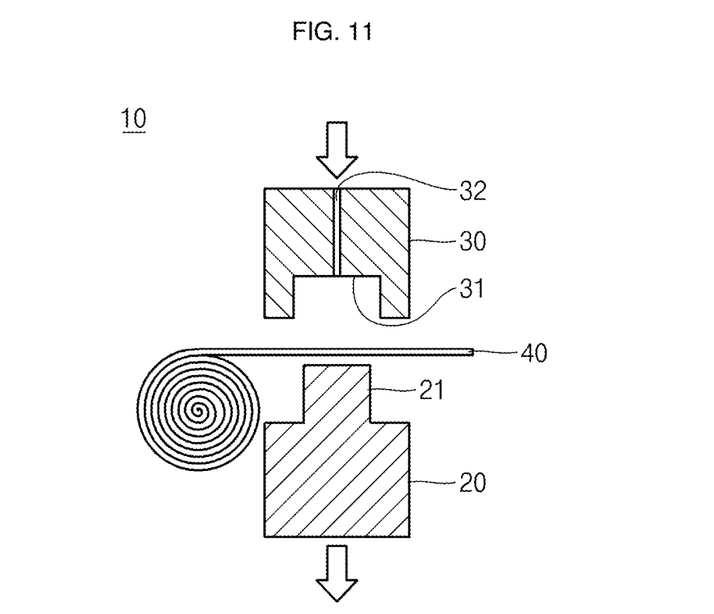
FIG. 11 is a cross-sectional view illustrating a jig for forming the tray for a secondary battery according to an embodiment of the present disclosure.

FIG. 11 is a cross-sectional view illustrating a jig for forming the tray for secondary batteries according to an embodiment of the present disclosure.

In the illustrated embodiment, the jig 10 includes a lower mold 20 and an upper plug 30.

The lower mold 20 is made of a metal and includes a protrusion 21 for forming a receiving space of a tray. The protrusion 21 is formed to have a size corresponding to the size of a secondary battery received in the tray. The lower mold 20 is formed in a relief structure, so that dimension management of the receiving space can be easily achieved, irrespective of the thickness of a material sheet 40 utilized to form the tray. For example, if the lower mold 20 is formed in an intaglio structure (e.g., a recessed structure), the internal receiving space may be reduced as the thickness of the material sheet 40 is increased. In this case, it would be necessary to newly fabricate a lower mold depending on the thickness of the material sheet 40 and the manufacturing cost may increase accordingly. According to various embodiments of the jig of the present disclosure, however, since the lower mold 20 is formed in a relief structure, the dimension of the internal receiving space can be constantly maintained, irrespective of the thickness of the material sheet 40.

In one or more embodiments, the upper plug 30 is made of wood and includes a coupling groove 31 configured to engage with the protrusion 21 of the lower mold 20. In addition, a discharge hole 32 is formed at the center of the coupling groove 31. The coupling groove 31 is engaged with the protrusion 21 to form the receiving space of the tray 100. According to various embodiments of the present disclosure, when the thickness of the material sheet 40 is changed, only the upper plug 30, which is made of a relatively cheap wood, has to be changed (i.e., the lower mold 20, which is made of a metal, does not have to be changed when the thickness of the material sheet 40 changes), thereby saving cost. In addition, the discharge hole 32 is formed at the center of the coupling groove 31 and extends through the upper plug 30. The discharge hole 32 serves as a passage for discharging internal air and releasing heat during molding of the tray 100. Therefore, the discharge hole 32 functions to rapidly cool the tray to prevent the tray from sticking to the upper plug 30, thereby improving the formability of the tray 100.

While the tray for a secondary battery according to the present invention and the jig for forming the same have been particularly shown and described with reference to a particular exemplary embodiment thereof, it will be understood by those of ordinary skill in the art that various changes in form and details may be made therein without departing from the spirit and scope of the present invention as defined by the following claims.

What is claimed is:

1. A tray for a plurality of cylindrical secondary batteries, the tray comprising:
    a plurality of receiving spaces, each receiving space of the plurality of receiving spaces for receiving one cylindrical secondary battery of the plurality of cylindrical secondary batteries; and
    a flange portion at an outer part of the plurality of receiving spaces,
    wherein each receiving space of the plurality of receiving spaces comprises:
    a bottom surface configured to support one cylindrical secondary battery of the plurality of cylindrical secondary batteries;
    a plurality of fixing ribs protruding upwardly from the bottom surface, the plurality of fixing ribs being spaced apart from each other and spaced around an outer portion of the bottom surface; and
    a plurality of bridges protruding upwardly from the bottom surface, each bridge of the plurality of bridges connecting adjacent fixing ribs of the plurality of fixing ribs,
    wherein a first number of the plurality of fixing ribs for each receiving space of the plurality of receiving spaces at an outer periphery of the tray is less than a second number of the plurality of fixing ribs for each receiving space of the plurality of receiving spaces at an inner part of the tray, and
    wherein the first number of the plurality of fixing ribs for each receiving space of the plurality of receiving spaces at the outer periphery of the tray comprises two first fixing ribs in the inner part of the tray and one second fixing rib on an inner wall surface of the flange portion.

2. The tray of claim 1, wherein the second number of the plurality of fixing ribs for each receiving space of the plurality of receiving spaces at the inner part of the tray comprises four first fixing ribs in the inner part of the tray, and wherein the four first fixing ribs are spaced apart from each other at 90 degree intervals relative to a center point of the bottom surface.

3. The tray of claim 1, wherein each bridge of the plurality of bridges has a smaller areas than each fixing rib of the plurality of fixing ribs, and wherein each bridge of the plurality of bridges has a lower height than each fixing rib of the plurality of fixing ribs.

4. The tray of claim 1, wherein the flange portion comprises:
    a pair of first flange parts extending in a first direction of the tray and parallel with each other; and
    a pair of second flange parts extending in a second direction perpendicular to the first direction and connecting the pair of first flange parts together,
    wherein at least one first flange part of the pair of first flange parts comprises an impact absorbing unit protruding downwardly and convexly from the at least one first flange part.

5. The tray of claim 1, wherein the tray comprises a plastic, an inorganic material, a decomposition agent, a dispersant, and a lubricant.

6. The tray of claim 5, wherein the plastic is contained in an amount of 66% to 70%, the inorganic material is contained in an amount of 30% to 33%, the decomposition agent is contained in an amount of 1% to 3%, and the dispersant agent and lubricant are contained in an amount of 1% to 3%.

* * * * *